Oct. 20, 1942.    T. E. BOSWORTH    2,299,708
OPHTHALMIC MOUNTING
Filed June 24, 1940
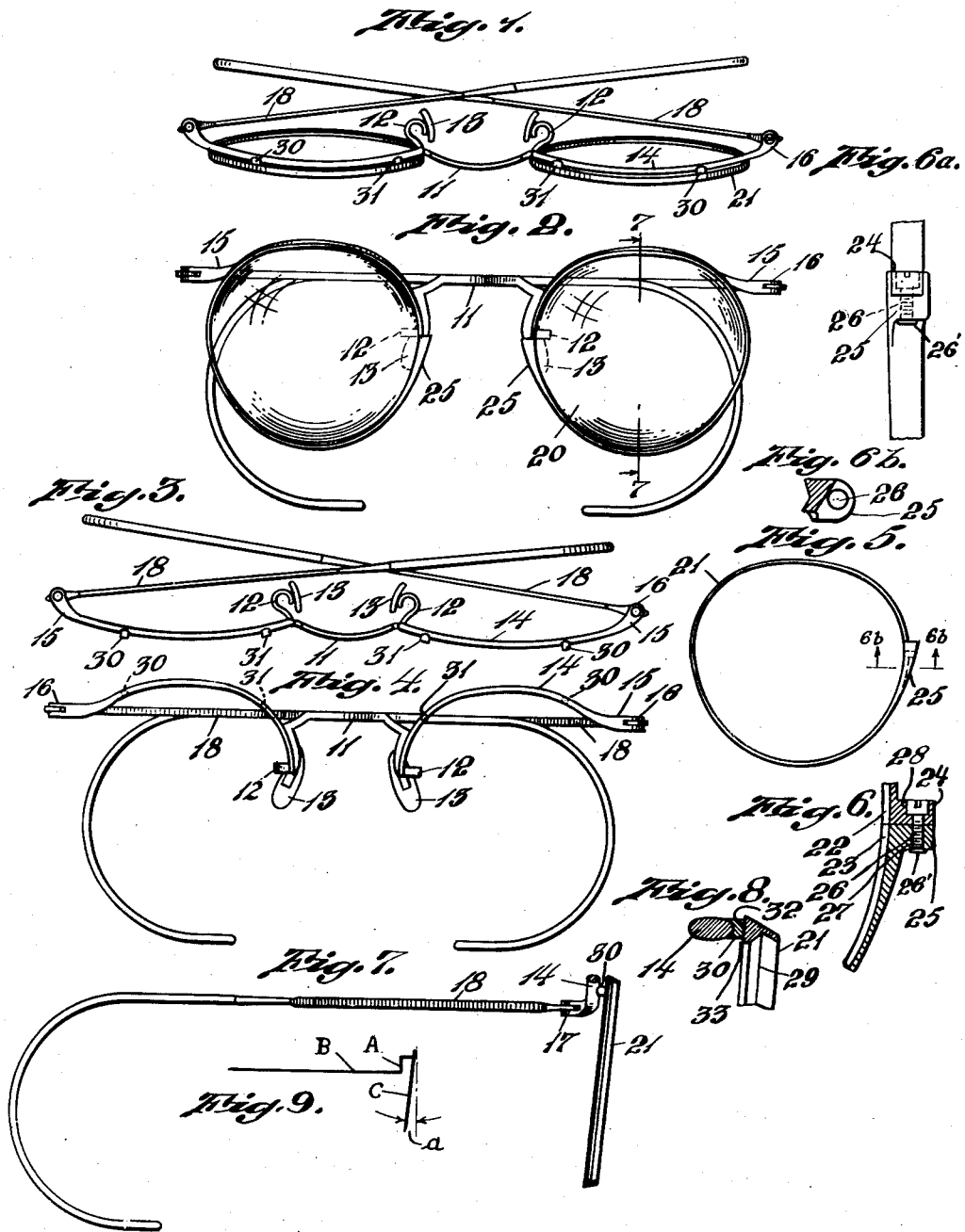
INVENTOR.
Thomas E. Bosworth
BY Barlow & Barlow
ATTORNEYS.

Patented Oct. 20, 1942

2,299,708

UNITED STATES PATENT OFFICE 2,299,708

OPHTHALMIC MOUNTING

Thomas E. Bosworth, Cranston, R. I., assignor to Universal Optical Company, Inc., a corporation of Rhode Island Application June 24, 1940, Serial No. 342,079

4 Claims. (Cl. 88—41)

This invention relates to an ophthalmic mounting and has for one of its objects to provide in a construction having an arcuate bar just back of the upper edge of the lens, an arrangement whereby the lens may be disposed at an angle to the end piece and temple extending therefrom without twisting the arcuate bar and end piece at the end thereof so as to dispose the two in an angular relation to the lens as desired.

The invention consists in providing an angular relation between the lens holder and the arcuate bar, rather than between the arcuate bar and the end piece and temple extending therefrom.

Another object of the invention is to provide for the mounting of a rim for the reception of a lens at the desired angle to an arcuate bar located along the top of and in back of the lens with this rim disposed at the desired angle with reference to the end piece and the temple which extends therefrom.

With these and other objects in view, the invention consists of certain novel features of construction, as will be more fully described and particularly pointed out in the appended claims.

In the accompanying drawing:

Fig. 1 is a top plan view of a spectacle formed in conformity with my invention;

Fig. 2 is a face view thereof;

Fig. 3 is a top plan view of the frame portion of the spectacle with the lenses and their rims omitted;

Fig. 4 is a face view of the structure shown in Fig. 3;

Fig. 5 shows a face view of a lens rim;

Fig. 6 is a central sectional detail of the separable ends of the lens rims;

Fig. 6a is an end view of the separable ends;

Fig. 6b is a section on line 6b—6b of Fig. 5;

Fig. 7 is a section on substantially line 7—7 of Fig. 2, showing the connection of the lens rim to the temple support bar;

Fig. 8 is an enlarged detail showing a section through this connection with but a fragment of the lens rim illustrated; and Fig. 9 diagrammatically illustrates the relation of the planes of the parts of the frame.

Heretofore, high positioned end pieces have been mounted on lens rims so as to dispose the horizontal plane of the end pieces in line with the temple, while the plane of the lens rim is at an angle to this horizontal plane somewhere in the neighborhood of 12 degrees. This is usually accomplished by providing the end of the end piece with a slot to receive the lens rim so that it may fit on the lens rim at the desired angle. Such end piece has a high position with reference to the optical center of the lens.

There is also the rimless type of mounting which consists of an arcuate bar to follow along the upper edge of the lens and located just back of the upper edge of the lens. This bar is secured to some part of the bridge assembly and serves as a support for the temple, the lens being mounted in a strap which is a part of the bridge assembly. The plane of the lens and bar will be the same. In such a mounting, the end piece which is carried by the end of the arcuate bar is twisted to dispose it in a horizontal plane to align with the temple which is attached thereto. Thus, the temple and its end piece are disposed at an angle to the plane of the arcuate bar which angle will be approximately 12 degrees. The invention, however, in its broader aspect is designed to eliminate the necessity of twisting the bar to dispose the end piece in the horizontal plane of the temple, as has characterized the construction of the prior mounting just described; rather I provide for the right angular arrangement of the plane of the arcuate bar and the plane of the temple, while I accomplish the angularity by disposing the lens holder at an angle to both the arcuate bar and the plane of the temple which may be done by mounting a lens rim directly upon the bar but disposing it at the desired angle by reason of the mounting means; and the following is a detailed description of the present embodiment of my invention and showing the preferred form by which these advantageous results may be accomplished.

In the use of a rim attached to an arcuate bar of the above-mentioned character, the lens rim will have a point of separation at its nasal edge, the upper part being secured to the temple support bar, while the lower part of the lens rim is held to the upper part by means of a screw.

With the reference to the drawing, 11 designates the bridge which is attached to the inner ends of arcuate temple support bars 14 to which rearwardly-extending nose pad support arms 12 with nose pads 13 are attached. These arcuate bars sweep upwardly and laterally outwardly from the bridge and arc downwardly from their crest which is usually arched forwardly to generally follow the upper contour or periphery of the lens. The general plane of the bar is intended to be substantially vertical when the frame is in position on the face of the wearer and is represented at A in Fig. 9.

The ends 15 of these arcuate bars extend rearwardly and are slotted as at 16 to receive the ends 17 of the temples 18. The end portions 15 are located in a plane extending at substantially right angles to the plane of the arcuate bars 14 from which the temples extend horizontally in this same right angular plane, as illustrated diagrammatically at B in Fig. 9, so that the plane of the arcuate bar and the plane of the temples are at right angles to each other and in substantially vertical and horizontal positions when the mounting is on the face of the wearer.

Each lens is designated generally 20 and is provided with a peripheral rim 21 having separable ends 22 and 23 provided with enlargements 24 and 25 for the reception of a locking screw 26 which has threaded engagement as at 27 with the part 25 and extends slidingly through part 24 in recess 28 thereof. The end of the screw 26 may be spun over as at 26' to hold it in place. The forward portion of the enlargement 25 extends above the junction of the enlargements 24 and 25 to cover the enlargement 24 and hide any junction space or line between these parts. This separable end of the rim is conveniently located at the nasal portion or edge of the lens. The rim is grooved as at 29 to receive the V-shaped edge of the lens.

Two bendable studs 30 and 31 (see (Fig. 4 and Fig. 8) are secured to the oval-shaped bar 14 so as to project forwardly therefrom. The end 32 of these studs presents a surface at the desired angle to the plane A of the arcuate bar 14, (one usual angle being 12 degrees, although this may be varied throughout somewhat of a range depending upon the needs of the patient) so as to abut the inner surface 33 of the rim 21, where the rim is soldered to the studs 30 and 31 in a position to dispose the rim in the desired angular relation, as shown at C in Fig. 9. The angularity being designated $a$ may be varied by bending the studs 30, 31 to provide the desired inclination. A third point of attachment to the bar may be had by soldering the end 24 to the inner end of the bar which serves to reinforce this position of the lens rim with relation to the frame or temple support bars.

From the foregoing it will be readily apparent that I have provided a definite right angular relation between the planes of the temple support bar and the temple, rather than twisting the temple end piece, and have angled the lens holder, rim 21 so as to provide the desired angular relation $a$ between the lens and the vertical. Thus, I have provided an entirely different system of mounting a lens on a frame for acquiring the desired angular relation.

It will be of course apparent that the temple support bar 14 is hidden behind the upper edge of the lens.

I claim:

1. In an ophthalmic mounting, an assembly comprising a pair of arcuate temple support bars disposed in generally an upright plane, a bridge connecting said bars, end pieces carried by said bars, temples hinged to said end pieces, said temples and end pieces being disposed in a plane extending at substantially right angles to the plane of said bars, a pair of lenses, lens rims for said lenses and studs projecting forwardly from said bars and connected to said rims and arranged to dispose the rims at an acute angle to the plane of said bars.

2. In an ophthalmic mounting, an assembly comprising a pair of lenses, lens-holding rims about said lenses, a pair of arcuate supporting bars to support said lens rims and disposed in generally an upright plane and arranged to extend behind and substantially along the upper curved portions of said lens rims in spaced relation thereto, a bridge connecting the inner ends of said bars, nose-pad support arms affixed to and projecting rearwardly from the point of connection of said bridge with the inner ends of said bars, nose pads carried by the free ends of said nose pad support arms, temple hinging end pieces carried at the outer ends of said arcuate support bars, temples hinged to said end pieces, said temples and end pieces being disposed in a plane extending at substantially right angles to the plane of said bars, and studs projecting forwardly from said bars and fixedly connecting said lens rims with said bars at spaced points intermediate the ends of said arcuate bars, said studs being arranged to dispose the lens rims and the lenses at an angle to the plane of said bars.

3. In an ophthalmic mounting, an assembly comprising a pair of arcuate temple support bars disposed in generally an upright plane, a bridge connecting said bars, end pieces carried by said bars, temples hinged to said end pieces, said temples and end pieces being disposed in a plane extending at substantially right angles to the plane of said bars, a pair of lenses, lens rims for said lenses and provided with a surface in a single plane and studs projecting forwardly from said bars and provided with an end surface in a plane at an acute angle to the plane of said bars and abutting the said surface of said lens rims and attached thereto to dispose the rims at an acute angle to the bars.

4. In an ophthalmic mounting, an assembly comprising a pair of lenses, lens-holding rims about said lenses and provided with a surface in a single plane, a pair of arcuate supporting bars to support said lens rims and disposed in generally an upright plane and arranged to extend behind and substantially along the upper curved portions of said lens rims in spaced relation thereto, a bridge in said plane connecting the inner ends of said bars, nose-pad support arms affixed to and projecting rearwardly from the points of connection of said bridge with the inner ends of said bars, nose pads carried by the free ends of said nose pad support arms, temple hinging end pieces carried at the outer ends of said arcuate support bars, temples hinged to said end pieces, said temples and end pieces being disposed in a plane extending at substantially at right angles to the plane of said bars and bridge, and studs projecting forwardly from said bars at spaced points intermediate the ends of said arcuate bars, and provided with end surfaces in a plane at an acute angle to the plane of said bars and abutting the said surface of said lens rims and attached thereto to dispose the rims at an acute angle to the bars.

THOMAS E. BOSWORTH.